United States Patent [19]
Apsit et al.

[11] 4,131,811
[45] Dec. 26, 1978

[54] TRACTION MEANS WITH ELECTRODYNAMIC VEHICLE SUSPENSION FOR HIGH-SPEED LAND TRANSPORT

[75] Inventors: Voldemar V. Apsit; Zigurd K. Sika; Ivan I. Kurkalov, all of Riga, U.S.S.R.

[73] Assignee: Fiziko-Energetichesky Institut Akademii Nauk Latviiskoi SSR, Riga, U.S.S.R.

[21] Appl. No.: 810,883

[22] Filed: Jun. 28, 1977

[30] Foreign Application Priority Data

Jul. 12, 1976 [SU] U.S.S.R. .............................. 2384764

[51] Int. Cl.² .......................................... H02K 41/02
[52] U.S. Cl. ........................ 310/12; 104/148 MS; 104/148 LM; 104/148 SS; 310/13
[58] Field of Search ................................ 310/12–14; 308/10; 104/148 R, 148 SS, 148 MS, 148 LM

[56] References Cited

U.S. PATENT DOCUMENTS

| 3,470,828 | 10/1969 | Powell, Jr. et al. | 104/148 SS |
| 3,589,300 | 6/1971 | Wipf | 310/13 X |
| 3,768,417 | 10/1973 | Thornton et al. | 104/148 SS |
| 3,780,667 | 12/1973 | Miericke et al. | 104/148 MS |
| 3,804,023 | 4/1974 | Massar et al. | 104/148 SS |
| 3,842,751 | 10/1974 | Thornton et al. | 104/148 SS |
| 3,867,886 | 2/1975 | Maki | 104/148 SS |
| 3,890,906 | 6/1975 | Maki | 104/148 MS |
| 3,904,899 | 9/1975 | Malfert | 310/12 |
| 3,952,668 | 4/1976 | Urankar | 104/148 MS |
| 3,960,090 | 6/1976 | Maki et al. | 104/148 SS |

*Primary Examiner*—Donovan F. Duggan
*Attorney, Agent, or Firm*—Fleit & Jacobson

[57] ABSTRACT

Disclosure is made of a traction means with electrodynamic suspension of a vehicle, intended for high-speed land transport and comprising a synchronous linear motor whose exciting winding is mounted on the vehicle and at the same time serves as the exciting winding for electrodynamic suspension of the vehicle, whereas the three-phase armature winding of said synchronous linear motor extends horizontally along the track and is a single-layer winding with one turn for the pole and phase. In the active area, the conductors of the armature winding are made as strips parallel to the track plane and having a width up to one third of the pole pitch. The exciting winding induces eddy currents in said strips on the side of the vehicle, which eddy currents ensure electrodynamic suspension of the vehicle. Traction means of this type can be used in the future in high-speed urban and suburban transport.

2 Claims, 3 Drawing Figures

TRACTION MEANS WITH ELECTRODYNAMIC VEHICLE SUSPENSION FOR HIGH-SPEED LAND TRANSPORT

The present invention relates to electric equipment of transportation means and, more particularly, to a traction means with electrodynamic suspension of a vehicle, intended for high-speed land transport. The invention can be used in the future in urban and suburban land transport.

At present, one of the most promising traction means with magnetic suspension of vehicles, employed in high-speed land transport, is the traction means of the type that features electrodynamic suspension of vehicles in combination with synchronous linear traction motors, which ensures a sufficiently high efficiency of the linear motors and a comparatively great height of magnetic levitation in the order of 150 to 250 mm. In view of the absence of sufficiently reliable methods and means for supplying current to a vehicle moving at a high speed (at a speed of 300 to 500 kilometers per hour), the exciting winding of a conventional synchronous linear motors of high-speed land transport is arranged under the cars (carriages). The exciting winding forms a heteropolar magnetic system. The armature winding is on the track and extends throughout its length. To ensure magnetic levitation, a number of additional exciting coils are arranged on both sides of the linear motor with respective reaction strips of aluminum arranged on the track under said additional exciting coils. While the exciting winding of the suspension is in motion, it induces eddy currents in said aluminum strips, which eddy currents account for electrodynamic suspension of the vehicle. A traction means and electrodynamic vehicle suspension of this type are described, for example, in Proceedings of the IEEE, vol. 61, No. 5 (May 1973), Special Issue, New York, USA, pp. 586—598.

The major disadvantage of the traction means and electrodynamic vehicle suspension under review resides in the comparatively complicated, metal-consuming and costly track structure comprising the three-phase armature winding and two reaction strips.

A number of ideas have been put forward with the aim of simplifying the track structure. In order to save metal in the manufacture of reaction strips, it is suggested that these should be composed of individual elements, primarily, in the form of short-circuited loops. The length of such loops in the direction of motion amounts to one third of the length of the exciting coils of the levitation system (cf. pp. 579—586 of the above-mentioned Proceedings).

According to another proposal, exciting coils mounted on the vehicle are used for both traction and levitation. Armature windings and reaction strips are arranged on the track in two layers (cf. p. 585 of the above-mentioned Proceedings). This system, too, is complicated and requires much metal for the track structure, yet it only dispenses with the necessity of using separate vehicle-mounted exciting coils for traction and levitation. It is even more difficult to arrange the armature windings on the surface of the reaction strips than arrange them side by side, so the latter proposal leaves much room for improvement.

It is an object of the present invention to substantially reduce the weight of the vehicle.

It is another object of the invention to provide a simple and cheap track structure by considerably reducing the amount of metal used in its construction.

The objects of the present invention are attained by providing a traction means with electrodynamic suspension of a vehicle for high-speed land transport, comprising a synchronous linear motor whose three-phase armature winding extends horizontally along the track, whereas the exciting winding is mounted on the vehicle and also serves as the exciting winding for electrodynamic suspension of the vehicle, in which traction means said armature winding of the motor is a single-layer winding, according to the invention, with one turn for the pole and phase, the conductors of the armature winding in the active area being made as strips extending in parallel with the plane of the track and having a width of up to one third of the pole pitch, the exciting winding inducing eddy currents in said strips on the side of the vehicle, which eddy currents ensure electrodynamic suspension of the vehicle.

It is expedient that a central hole should be provided in each strip of the armature winding to produce short-circuited loops.

If the above requirement is complied with, the width of each turn of the armature winding in its active area may be up to one third of the pole pitch of the exciting winding, i.e. the turns are of the same width as the individual elements of which the reaction strip is composed. This makes it possible to use the active portions of the armature winding turns as the elements of the reaction strip.

Other objects and advantages of the present invention will become more apparent from the following detailed description of a preferred embodiment thereof to be read in conjunction with the accompanying drawings, wherein.

Figure 1:
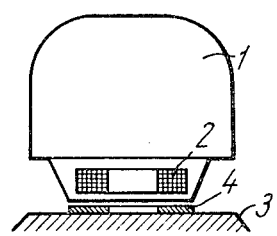
FIG. 1 is a general cross-sectional view of a traction means in accordance with the invention.
Figure 2:
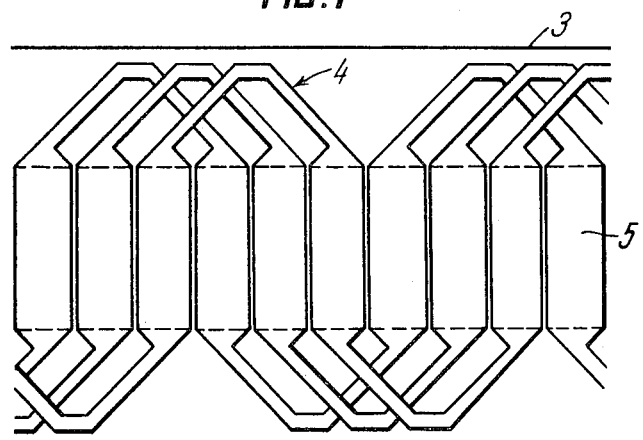
FIG. 2 is a view of the three-phase armature winding of the synchronous linear motor with strip-like active portions of the conductors.

The proposed traction means with electrodynamic suspension of a vehicle 1 (FIG. 1) comprises an exciting winding 2 composed of a number of coils, primarily, superconductor coils, which form a heteropolar magnetic system along the vehicle 1. Horizontally extending on a track 3 is a three-phase singlelayer armature winding 4. The active portions of the conductors of said armature winding 4 are made as strips 5 (FIG. 2) of a maximum possible width which amounts to one third of the pole pitch.

Figure 3:
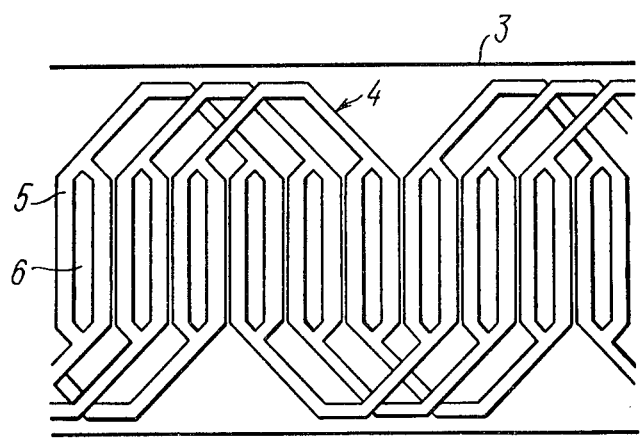
FIG. 3 is a view of the three-phase armature winding of the same motor with short-circuited active portions of the conductors.

The active portions of the conductors of the armature winding 4, i.e. the strips 5, may be made as short-circuited loops arranged in the plane of the track 3 (FIG. 3). The width of such loops is like that of the strips 5. Such loops can be provided by stamping out central holes 6 in the strip-like active portions of the conductors; the loops can also be composed of two electrically interconnected buses. Both ways of producing the strips 5 are equally advantageous, keeping in mind that the conductor section is to be selected with reference to the sum total of current supplied to the winding and eddy currents.

When the vehicle 1 is in motion, the exciting winding 2, which is mounted on said vehicle 1, moves along the track 3 with respect to the armature winding 4 and induces eddy currents in the strips 5, which eddy currents ensure electrodynamic suspension of the vehicle 1. This makes it possible to dispense with additional reaction strips to be arranged on the track for electrodynamic suspension of said vehicle 1.

In the proposed traction means with electrodynamic suspension, the functions of the synchronous linear motor and those of a magnetic levitation system are combined; there are no structural components intended specifically for one of said functions. Thus the proposed traction means is simpler and cheaper by far, and consumes much less metal than any other traction means known heretofore.

What is claimed is:

1. A traction means with electrodynamic suspension of a vehicle for high-speed land transport, comprising:
   a synchronous linear motor;
   an exciting winding of said synchronous linear motor, mounted on said vehicle and also serving as the exciting winding for electrodynamic suspension of said vehicle;
   a three-phase armature winding of said synchronous linear motor, horizontally extending along the track, said armature winding being a single-layer winding with one turn for the pole and phase, its conductors in the active area being made as strips extending in parallel with the plane of the track and having a width of up to one third of the pole pitch, said exciting winding inducing eddy currents in said strips on the side of said vehicle, which eddy currents ensure electrodynamic suspension of said vehicle.

2. A traction means as claimed in claim 1, wherein a central hole is provided in each of said armature winding strips in order to produce short-circuited loops.

* * * * *